US011026303B2

(12) United States Patent
Wu et al.

(10) Patent No.: US 11,026,303 B2
(45) Date of Patent: Jun. 1, 2021

(54) ILLUMINATOR

(71) Applicant: HIMAX TECHNOLOGIES LIMITED, Tainan (TW)

(72) Inventors: Biing-Seng Wu, Tainan (TW); Han-Yi Kuo, Tainan (TW); Kuan-Ming Chen, Tainan (TW); Li-Chiu Tsai, Tainan (TW); Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 233 days.

(21) Appl. No.: 16/175,814

(22) Filed: Oct. 30, 2018

(65) Prior Publication Data

US 2020/0137843 A1 Apr. 30, 2020

(51) Int. Cl.
| H05B 45/00 | (2020.01) |
| G02B 5/02 | (2006.01) |
| G02B 27/30 | (2006.01) |
| G02B 27/09 | (2006.01) |

(52) U.S. Cl.
CPC ........... *H05B 45/00* (2020.01); *G02B 5/0205* (2013.01); *G02B 27/0961* (2013.01); *G02B 27/30* (2013.01)

(58) Field of Classification Search
CPC ...... A61B 2050/006; A61B 2050/0067; A61B 2050/0078; A61B 50/00; A61B 50/30; A61B 50/34; A61L 2202/182; A61L 2/26; B65D 55/12; G02B 27/0961; G02B 27/30; G02B 5/0205; H05B 45/00
See application file for complete search history.

(56) References Cited

U.S. PATENT DOCUMENTS

| 5,641,219 | A | * | 6/1997 | Mizobe | G02B 6/0061 |
| | | | | | 362/23.13 |
| 6,425,673 | B1 | * | 7/2002 | Suga | G02B 6/0036 |
| | | | | | 349/65 |
| 2003/0002151 | A1 | * | 1/2003 | Yano | H04N 9/3152 |
| | | | | | 359/443 |
| 2004/0247011 | A1 | * | 12/2004 | Okazaki | G02B 19/0095 |
| | | | | | 372/108 |
| 2007/0024971 | A1 | * | 2/2007 | Cassarly | G02B 27/0994 |
| | | | | | 359/485.03 |
| 2008/0239498 | A1 | * | 10/2008 | Reynolds | H04N 9/315 |
| | | | | | 359/618 |
| 2013/0021581 | A1 | * | 1/2013 | Takahashi | H01S 5/02296 |
| | | | | | 353/31 |
| 2014/0160563 | A1 | * | 6/2014 | Hasegawa | G02B 30/27 |
| | | | | | 359/463 |

FOREIGN PATENT DOCUMENTS

| CN | 107003558 A | 8/2017 |
| TW | 200538810 A | 12/2005 |
| TW | 201115177 A1 | 5/2011 |
| TW | 201115184 A1 | 5/2011 |
| TW | M455809 U | 6/2013 |

\* cited by examiner

Primary Examiner — Joseph P Martinez
Assistant Examiner — Vipin Patel
(74) Attorney, Agent, or Firm — CKC & Partners Co., LLC

(57) ABSTRACT

An illuminator including a light source and an optical device is provided. The light source is configured to emit light. The optical device is configured to provide uniform illumination with at least one indicating mark after receiving light. The optical device includes a diffusing part and a directing part. The diffusing part is configured to provide uniform illumination. The directing part is configured to provide at least one indicating mark.

4 Claims, 3 Drawing Sheets

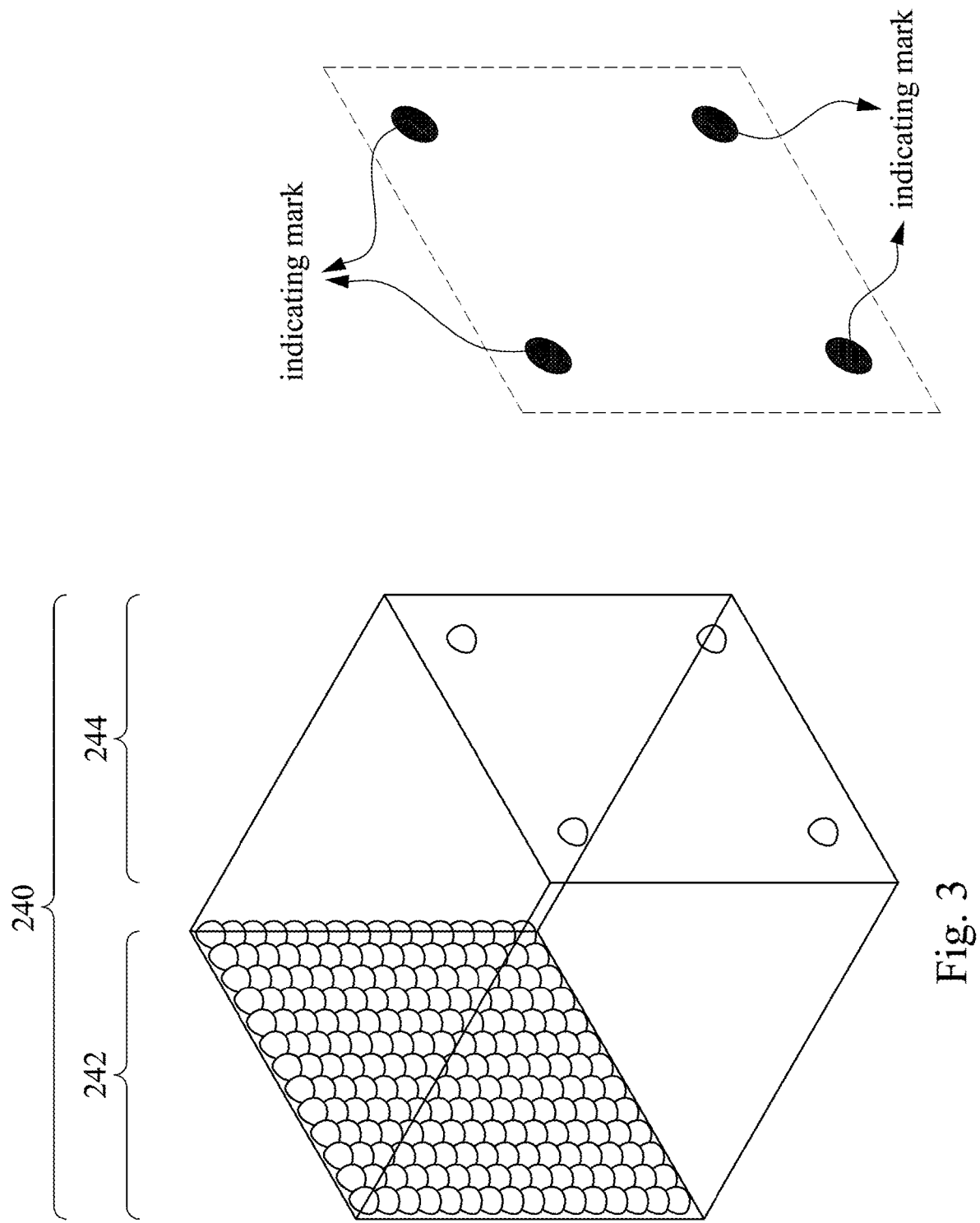

ILLUMINATOR

BACKGROUND

Field of Invention

The present invention relates to an illuminator. More particularly, the present invention relates to an illuminator for providing uniform illumination with at least one indicating mark.

Description of Related Art

In some cases, beam shaping is desired to achieve a uniform intensity profile for illumination and to include some indicating marks for fast FOV (field of view) calibration. However, besides the light source, it generally needs more than one optical element to meet such requirement. For example, one optical element, e.g. diffuser, is configured to attain uniform light distribution, and the other optical element is configured to provide the indicating marks, e.g. spots.

SUMMARY

The present invention provides an illuminator including a light source and an optical device. The light source is configured to emit light. The optical device is configured to provide uniform illumination with at least one indicating mark after receiving light. The optical device includes a diffusing part and a directing part. The diffusing part is configured to provide uniform illumination. The directing part is configured to provide at least one indicating mark.

In accordance with one or more embodiments of the invention, the illuminator further includes a collimation lens disposed between the light source and the optical device and configured to focus light.

In accordance with one or more embodiments of the invention, the light source is Light-emitting diode (LED), Vertical-Cavity Surface-Emitting Laser (VCSEL), or Laser Diode (LD).

In accordance with one or more embodiments of the invention, the diffusing part has a subwavelength structure.

In accordance with one or more embodiments of the invention, the diffusing part has a surface relieved structure.

In accordance with one or more embodiments of the invention, the diffusing part is a diffractive optical element.

In accordance with one or more embodiments of the invention, the diffusing part is a microlens array.

In accordance with one or more embodiments of the invention, the directing part is a diffractive optical element.

In accordance with one or more embodiments of the invention, the directing part is at least one lens or a microlens array.

In accordance with one or more embodiments of the invention, the diffusing part is a microprism.

BRIEF DESCRIPTION OF THE DRAWINGS

The invention can be more fully understood by reading the following detailed description of the embodiment, with reference made to the accompanying drawings as follows:

FIG. 3 illustrates a perspective view of an optical device of the illuminator according to the second embodiment of the present invention.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
FIG. 1 illustrates an illuminator according to a first embodiment of the present invention.
Figure 1:
Figure 1:
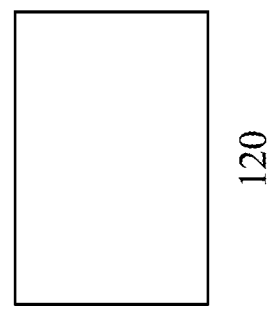

FIG. 1 illustrates an illuminator 100 according to a first embodiment of the present invention. The illuminator 100 includes a light source 120 and an optical device 140. The light source 120 is configured to emit light. The light source 120 may be Light-emitting diode (LED), Vertical-Cavity Surface-Emitting Laser (VCSEL), or Laser Diode (LD). The optical device 140 is a diffractive optical element (DOE) and is configured to provide uniform illumination with at least one indicating mark after receiving the light.

In the first embodiment, the diffractive optical element (DOE) may serve as a diffuser, thereby providing uniform illumination after receiving light. In the first embodiment, the diffractive optical element (DOE) may further serve as a pattern generator, and the light passes through the diffractive optical element (DOE) to generate a projected image, where the projected image may have a special pattern with at least one indicating mark set by the diffractive optical element (DOE).

In the first embodiment, the illuminator 100 may selectively include a collimation lens 160 disposed between the light source 120 and the optical device 140. The collimation lens 160 is configured to focus the light. The optical device 140, i.e. the diffractive optical element (DOE), is configured to provide uniform illumination with at least one indicating mark after receiving the focused light.

Figure 2:
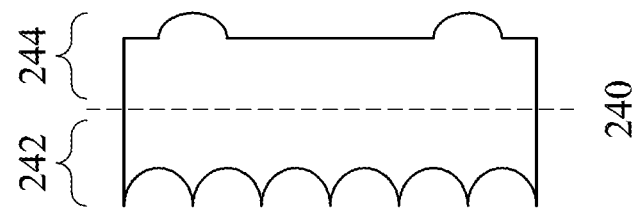
FIG. 2 illustrates an illuminator according to a second embodiment of the present invention.
Figure 2:
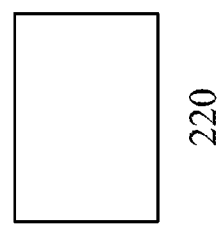

FIG. 2 illustrates an illuminator 200 according to a second embodiment of the present invention. The illuminator 200 includes a light source 220 and an optical device 240. The light source 220 is configured to emit light. The light source 220 may be Light-emitting diode (LED), Vertical-Cavity Surface-Emitting Laser (VCSEL), or Laser Diode (LD).

The optical device 240 includes a diffusing part 242 and a directing part 244. The diffusing part 242 and the directing part 244 are disposed on opposite sides of the optical device 240. FIG. 3 illustrates a perspective view of the optical device 240 of the illuminator 200 according to the second embodiment of the present invention. The diffusing part 242 of the optical device 240 of the illuminator 200 is a lens array and is configured to provide uniform illumination. The diffusing part 242 of the optical device 240 of the illuminator 200 has plural concave spherical structures periodically arranged on one surface of the optical device 240 of the illuminator 200. The arrangement or the surface shape of the lens array is adjustable, thereby changing the field of view (FOV) or the light intensity distribution.

The directing part 244 of the optical device 240 of the illuminator 200 includes at least one lens and is configured to provide at least one indicating mark. As shown in FIG. 3, the directing part 244 includes four lenses, thereby providing four indicating marks. It is noted that the number or the position of the lenses is adjustable, thereby changing the number or the position of the indicating marks.

In some embodiments of the present invention, the illuminator including a light source and an optical device. The light source is configured to emit light. The optical device is configured to provide uniform illumination with at least one indicating mark after receiving light. The optical device includes a diffusing part and a directing part. The diffusing part may have a subwavelength structure or a surface relieved structure, or the diffusing part may be a diffractive optical element (DOE) or microlens array. The diffusing part is configured to provide uniform illumination. The directing part may be the diffractive optical element (DOE), at least one lens, a microlens array, or a microprism. The directing part is configured to provide at least one indicating mark.

From the above description, the illuminator of the present invention includes single optical device to provide uniform illumination with at least one indicating mark after receiving light. The present invention does not need two independent optical devices, thereby providing uniform illumination and providing at least one indicating mark, respectively.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An illuminator, comprising:
   a light source configured to emit light;
   a collimation lens configured to focus the light emitted from the light source; and
   an optical device configured to provide uniform illumination with at least one indicating mark after the optical device has received the focused light from the collimation lens, wherein the collimation lens is disposed between the light source and the optical device, wherein the optical device comprises:
     a diffusing part configured to provide uniform illumination; and
     a directing part configured to provide the at least one indicating mark;
     wherein the directing part is a diffractive optical element, at least one lens, or a microlens array.

2. The illuminator of claim 1, wherein the light source is Light-emitting diode (LED), Vertical-Cavity Surface-Emitting Laser (VCSEL), or Laser Diode (LD).

3. The illuminator of claim 1, wherein the diffusing part is a diffractive optical element.

4. The illuminator of claim 1, wherein the diffusing part is a microlens array.

* * * * *